United States Patent
Hong et al.

(10) Patent No.: US 9,384,532 B2
(45) Date of Patent: *Jul. 5, 2016

(54) APPARATUS FOR IMPROVING FOGGED IMAGE USING USER-CONTROLLABLE ROOT OPERATOR

(71) Applicant: INDUSTRY FOUNDATION OF CHONNAM NATIONAL UNIVERSITY, Gwangju (KR)

(72) Inventors: Sung Hoon Hong, Gwangju (KR); Jae Won Lee, Gwangju (KR)

(73) Assignee: Industry Foundation of Chonnam National University, Gwangju (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/425,901
(22) PCT Filed: Nov. 5, 2013
(86) PCT No.: PCT/KR2013/009950
§ 371 (c)(1),
(2) Date: Mar. 4, 2015
(87) PCT Pub. No.: WO2014/193055
PCT Pub. Date: Dec. 4, 2014

(65) Prior Publication Data
US 2015/0287170 A1    Oct. 8, 2015

(30) Foreign Application Priority Data
May 28, 2013   (KR) .................. 10-2013-0060278

(51) Int. Cl.
*G06K 9/40* (2006.01)
*G06T 5/00* (2006.01)
(52) U.S. Cl.
CPC .............. *G06T 5/002* (2013.01); *G06T 5/007* (2013.01); *G06T 2207/10024* (2013.01); *G06T 2207/20012* (2013.01)
(58) Field of Classification Search
CPC ............ G06T 5/00; G06T 7/00; G06T 5/002; G06T 5/007; G06T 2207/10024; G06T 2207/20012; G06T 5/50; G06T 5/001; G06T 5/009; G06K 9/40; G06K 9/4652; H04N 5/335

USPC .................................................. 382/274–275
See application file for complete search history.

(56) References Cited

U.S. PATENT DOCUMENTS

| 7,423,752 B2 * | 9/2008 | Leleve | B60Q 1/1423 |
| | | | 250/559.4 |
| 8,340,461 B2 * | 12/2012 | Sun | G06K 9/40 |
| | | | 358/3.26 |

(Continued)

FOREIGN PATENT DOCUMENTS

| JP | 2012-221237 A | 11/2012 |
| JP | 2013-058202 A | 3/2013 |

(Continued)

OTHER PUBLICATIONS

Jae-won Lee et al., "Visibility Enhancement in Fog Situation using User Controllable Dehazing Method", The Korean Institute of Information and Communication Engineering, Conference Journal, May 24, 2013, pp. 814-817, vol. 17, No. 1.

(Continued)

*Primary Examiner* — Kanjibhai Patel
(74) *Attorney, Agent, or Firm* — Rabin & Berdo, P.C.

(57) ABSTRACT

An apparatus for improving fogged image using user-controllable root operator comprises an atmosphere brightness value calculation unit for receiving a fogged input image and calculating the value of the brightest pixel of the atmosphere, a transmission calculation unit for calculating the lower bound of transmission rate by using the pixel value calculated by the atmosphere brightness value calculation unit and the fogged input image, and calculating the transmission rate for each pixel by computation processing of power operation with the lower bound of transmission rate according to the user control value, a restoration image computation unit for outputting restored image in which the fog is removed by using the transmission rate calculated by the transmission rate computation unit and the fogged input image, and a post-processing unit for outputting a fog-eliminated image by performing brightness stretching or color processing.

2 Claims, 5 Drawing Sheets

(56) References Cited

U.S. PATENT DOCUMENTS

| | | | |
|---|---|---|---|
| 8,417,053 B2* | 4/2013 | Chen | G06T 5/003 382/167 |
| 8,582,915 B2* | 11/2013 | Wen | H04N 19/51 382/261 |
| 2013/0071043 A1 | 3/2013 | Bai | |

FOREIGN PATENT DOCUMENTS

| KR | 10-2010-0021952 A | 2/2010 |
|---|---|---|
| KR | 10-2013-0012749 A | 2/2013 |
| KR | 10-2013-0015906 A | 2/2013 |
| WO | WO 2013-029337 A1 | 3/2013 |

OTHER PUBLICATIONS

Yoav Y. Schechner et al., "Instant Dehazing of Images Using Polarization", Proc. Computer Vision & Pattern Recognition, 2001, pp. 325-332, vol. 1.

Sarit Shwartz et al., "Blind Haze Separation", Proc. IEEE Computer Vision and Pattern Recognition, 2006, pp. 1984-1991, vol. II.

Srinivasa G. Narasimhan et al., "Chromatic Framework for Vision in Bad Weather", Proc. CVPR, Jun. 2000, pp. 598-605.

Srinivasa G. Narasimhan et al., "Contrast Restoration of Weather Degraded Images", IEEE Transactions on Pattern Analysis and Machine Intelligence, Jun. 2003, pp. 713-724, vol. 25, No. 6.

Shree K. Nayar et al., "Vision in Bad Weather", Proc. ICCV, Sep. 1999, pp. 820-827.

Johannes Kopf et al., "Deep Photo: Model-Based Photograph Enhancement and Viewing", ACM Trans. Graphics, Dec. 2008, pp. 1-10, vol. 27, No. 5.

Srinivasa G. Narasimhan et al., "Interactive (De) Weathering of an Image using Physical Models", In Workshop on Color and Photometric Methods in Computer Vision, Oct. 2003, pp. 1-8.

Robby T. Tan, "Visibility in Bad Weather from a Single Image", Proc. CVPR, Jun. 2008, pp. 1-8.

Raanan Fattal, "Single Image Dehazing", ACM Trans. Graphics, Aug. 2008, pp. 1-9, vol. 27, No. 3.

Kaiming He et al., "Single Image Haze Removal Using Dark Channel Prior", Proc. CVPR, Jun. 2009, pp. 1956-1963.

Jean-Philippe Tarel et al., "Fast Visibility Restoration from a Single Color or Gray Level Image", IEEE $12^{th}$ International Conference, Sep. 29, 2009-Oct. 2, 2009, pp. 2201-2208.

* cited by examiner (a) (a)

(a) Input luminance image (b) Fog-eliminated image (C=0.25)

(c) Fog-eliminated image (C=0.5)

(d) Fog-eliminated image (C=0.75)

APPARATUS FOR IMPROVING FOGGED IMAGE USING USER-CONTROLLABLE ROOT OPERATOR

TECHNICAL FIELD

The present invention relates to an apparatus for providing an image having visibility which is improved by removing fog or smoke from a luminance image of which the quality is reduced, in particular to an apparatus for improving fogged image using user-controllable root operator which is capable of user control for fog removal degree depending on weather conditions, and the apparatus for improving a fogged image using user-controllable root operator provides a closed formula which can calculate the fog-eliminated image of an input image by a pixel unit. Thus halo effect doesn't occur and real time processing is enabled by a small amount of calculation.

BACKGROUND ART

Recently, an image monitoring system or an image black box for automobiles, or the like is used for detection or prevention of accidents. Further, study is under progress for providing lane deviation or car collision warning by extracting lanes and a vehicle ahead from the image acquired by a video camera regarding a safety automobile of high technology.

In order to improve the performance of a computer vision application system or image process, a clean input image is needed. Particularly, when detecting or estimating an object or using the edge information of the image, the cleaner image will bring a better result.

However, in case of image taken outdoors, the brightness and the color reflected from an object are mixed with particles in the air. Thus, its original color and brightness contrast are not provided, especially, in case that there are big particles such as a fog and smoke in the air, As for the conventional method for improving an image which includes fog and etc., there is Korean Patent Publication No.10-2010-0021952 (hereinafter, 'prior art') in addition to a plurality of applications published and disclosed.

The method according to the prior art comprises a step of receiving the first luminance image of an image including Airlight, and producing a map of atmosphere Airlight based on the ratio of the standard deviation and the average of the first luminance image; and a step of outputting the second luminance image from which the atmosphere Airlight is removed by subtracting a map of atmosphere Airlight produced from the first luminance image. However, in the prior art a fogged image process is processed by a block unit, but not by a pixel unit.

On the other hand, a variety of methods for estimating a clean image by removing fog from a fogged image have been proposed. In the early stage, a method using a number of images or additional information besides to an image was proposed to restore a fogged image to a fog-eliminated image. As the method using a number of images, the method using polarization [1, 2] was proposed. This method acquires two or more images taken with respectively different polarization filter installed in precisely same location, and the depth value is calculated by using a method for measuring the polarized amount and the fog is removed by using it. However these methods provide a very good image in result, there is a strong limitation that respectively different polarization filters have to be used in the same location. In a method [3, 4, 5] using simply a number of images without using polarization filter, fog value and depth information are obtained from two images taken under different weather environment to remove the fog. Kopf, et al. [6] proposed a method for removing fog by using depth information of an image instead of using a number of images, and the fog was removed by obtaining depth or texture information by using GPS information embedded in a camera and assuming concentration (density) of fog value is depth information.

The methods for removing fog by using a number of images or using a single image with additional information have a defect that they cannot be adapted to an image taken by a dynamically-moving camera, because they need to secure image data in various conditions. Thus recently a method for removing fog by using a single image is being studied.

Tan [8] proposed a method for removing fog by increasing brightness contrast. That is, fog was removed by using the characteristic that a clean image without fog had higher edge strength than a fogged image and fog value didn't change rapidly. In this method, the brightness contrast is highly improved, thus the shape and structure of an image are advantageously revealed. But excessive increase of contrast may cause saturation. And halo effect may occur in the section where the depth information is largely different.

Fattal [9] proposed a method for restoring a fog-eliminated image by measuring the image reflection ratio through assumption that reflection ratio measured within a constant image area has always the same vector direction.

He et al. [10] used the characteristic that a clean image has a higher chroma of color than a fogged image, and proposed a method which removes fog by the observation result that a pixel with high color sharpness of a clean image without fog has a very low channel value of one of R, G, B values, thus a color image without fog has a pixel with very low channel value in a certain area. However, in case only a luminance image is used because RGB color is used in the conventional method using only a single image, fog-elimination performance is degraded. And as a large size of filter is used, halo effect occurs and a large calculation amount is required to refine transmission rate. Thus there is difficulty in real time processing.

Tarel et al. [11] proposed a fog elimination method using a median filter in order to improve the calculation speed, however, if using a large size of a median filter, there is a disadvantage that the calculation speed is decelerated, and a back light effect can occur.

[1] Y. Y. Schechner, S. G. Narasimhan, and S. K. Nayar, "Instant dehazing of images using polarization," in Proc. CVPR, pp. 1984-1991, Hawaii, USA, Dec. 2001.

[2] S. Shwartz, E. Namer, and Y. Y. Schechner, "Blind haze separation," in Proc. CVPR, pp. 1984-1991, New York, USA, Oct. 2006.

[3] S. G. Narasimhan and S. K. Nayar, "Chromatic framework for vision in bad weather," in Proc. CVPR, pp. 598-605, SC, USA, June 2000.

[4] S. G. Narasimhan and S. K. Nayar, "Contrast restoration of weather degraded images," IEEE Trans. Pattern Anal. Mach. Intell., vol. 25, no. 6, pp. 713-724, June 2003.

[5] S. K. Nayar and S. G. Narasimhan, "Vision in bad weather," in Proc. ICCV, pp. 820-827, Corfu, Greece, Sep. 1999.

[6] J. Kopf, B. Neubert, B. Chen, M. Cohen, D. Cohen-Or, O. Deussen, M. Uyttendaele, and D. Lischinski, "Deep photo: Model-based photograph enhancement and viewing," ACM Trans. Graphics, vol. 27, no. 5, pp. 1-10, Dec. 2008.

[7] S. G. Narasimhan and S. K. Nayar, "Interactive deweathering of an image using physical models," In Workshop on Color and Photometric Methods in Computer Vision, OCT. 2003

[8] R. Tan, "Visibility in bad weather from a single image," in Proc CVPR, pp. 1-8, Alaska, USA, June 2008.

[9] R. Fattal, "Single image dehazing," ACM Trans. Graphics, vol. 27, no. 3, pp. 1-9, Aug. 2008.

[10] K. He, J. Sun, and X. Tang, "Single image haze removal using dark channel prior," in Proc. CVPR, pp. 1956-1963, Miami, USA, June 2009.

[11] Tarel, Jean-Philippe; Hautiere, Nicolas; "Fast visibility restoration from a single color or gray level image," Computer Vision, 2009 IEEE 12th International Conference on, pp.2201-2208, Sept. 2009.

DISCLOSURE

Technical Problem

The present invention has been devised by considering the problems above, and the purpose of the present invention is to provide an apparatus which can provide a clean image by removing the effect that color sharpness and brightness contrast of an image taken by a camera are decreased by scattering and absorption by particles such as fog, smoke, cloud etc. in the air and mixture with other reflected light such as the sky and the earth.

The conventional method for removing fog uses R, G, B component of an input image, and in case of using only brightness component, performance is degraded. But, color coordinate system currently used in most multimedia system uses brightness signal and chrominance signal like YCbCr color coordinate system, but not RGB coordinate system. Thus, in order to adapt a conventional method, conversion process of color coordinate system is required. And in case an independent process for each R, G, B signal component is performed, the change of color can occur. Also as a large size filter is used in a conventional method for removing fog, halo effect occurs. And a large calculation amount is required, thus there is difficulty in real time processing. In addition, the degree of fog-elimination cannot be controlled according to the weather conditions.

In the present invention, the problems occurred in the conventional methods in the conventional methods can be solved by enabling the degree control of fog-elimination according to the weather conditions, and the fog-eliminated image can be calculated by providing closed formula for the fog-elimination. Thus, halo effect and large calculation amount problem in the conventional methods can be resolved.

Technical Solution

The present invention for accomplishing these technical objectives relates to an apparatus for improving fogged image using user-controllable root operator. And the apparatus comprises an atmosphere brightness value calculation unit for receiving a fogged input image and calculating the value of the brightest pixel of the atmosphere; a transmission calculation unit for calculating the lower bound of transmission rate by using the pixel value calculated by the atmosphere brightness value calculation unit and the fogged input image, and calculating the transmission rate for each pixel by computation processing of the power operation with the lower bound of transmission rate according to the user control value; a restoration image computation unit for outputting restored image in which the fog is removed by using the transmission rate calculated by the transmission rate computation unit and the fogged input image; and a post-processing unit for outputting a fog-eliminated final image by performing brightness stretching or color processing.

Advantageous Effects

According to the present invention as set forth, a clean image is provided by removing brightness and color component in the air for an image having lowered visibility due to mixture of light and color component of an object and light and color component in the air such as fog, smoke, cloud and the like. Currently color coordinate system used in most multimedia system uses brightness signal and chrominance signal like YCbCr color coordinate system unlike RGB coordinate system. Thus the proposed method which has excellent performance with only brightness information is easy to adapt to multimedia system without conversion process of color coordinate system and able to maintain the color of the input color. In particular, the present invention can solve the problem related to halo effect of the conventional method that uses the large size filter and a large calculation amount because the present invention performs pixel-unit operation. Thus it can be applied to real time applications, and user can directly control the brightness of the image and the degree of fog-elimination depending on the weather conditions.

Thus, in case of applying to a high resolution monitoring system, an image black box for automobile, fire prevention system, and the like, lowered visibility problem due to fog or smoke can be solved. And it can apply to safety vehicle which is recently under a lot of study.

DESCRIPTION OF THE REFERENCE CHARACTERS

100: Atmosphere brightness value computation unit
200: Transmission rate computation unit
300: Restored image computation unit
400: Post-processing unit
210: The lower bound of transmission rate computation module
220: Transmission rate computation module Best Mode Specific features and advantages of the present invention will be more clearly understood from the following detailed description when taken in conjunction with the accompanying drawings. In case functions related to the present invention and specific description for the configuration unnecessarily obscure the gist of the present invention, it is noticed that the specific description will be omitted.

Hereinafter, with reference to the accompanying drawings, the present invention is described in details.

With reference to FIGS. 1 to 5, an apparatus for improving fogged image using user-controllable root operator according to the present invention is described as follows.

The brightness and color of an outdoor image taken by a camera is determined by the light reflecting an object, the reflection light of the object is generally scattered or absorbed by the particles in the air, and mixed with other reflection light such as the sky and the earth. Thus the image taken by a camera has a decreased color sharpness and brightness contrast.

A general model for a fogged image which is used in a computer vision etc. is shown as the following [Equation 1].

$$I(x)=J(x)t(x)+I_\infty(1-t(x)),\quad\text{[Equation 1]}$$

wherein $I(x)$ is the x-th pixel of the fogged image acquired by a camera, $J(x)$ is a fog-eliminated clean image, $I_\infty$ is atmospheric brightness of the pixel in the image which is the farthest from the camera. $t(x)$ is transmission rate showing the rate of reflection light of an object which reaches the camera without attenuation.

In [Equation 1], the first term $J(x)t(x)$ is direct attenuation and the second term $I_\infty(1-t(x))$ is airlight. The direct attenuation means that the light reflected from an object is attenuated by the transmission rate, airlight occurs by scattering by the particles in the air.

In general, transmission rate $t(x)$ is exponentially decreased along the distance between a camera and an object on space as the following [Equation 2].

$$t(x)=e^{-\beta d(x)},\quad\text{[Equation 2]}$$

wherein $\beta$ is scattering coefficient of the air, $d(x)$ is distance between a camera and the point corresponding to the x-th pixel.

The value of scattering coefficient $\beta$ is related to particle size in the air. $\beta$ approaches 1 for big particles such as rain, heavy fog while it approaches 0 for small particles under the fine weather. Thus in case $\beta$ is constant, $\beta$ of distant location such as the sky gets close to 0. Accordingly, $I(x) \cong I_\infty$ in [Equation 1], and $I(x) \cong J(x)$ as the pixel in very close location has transmission rate approaching 1. Thus, the bright pixel in the image can be assumed as a case of far location and heavy fog, and transmission rate $t(x)$ will have a small value.

In order to remove fog, $I_\infty$ and $t(x)$ are obtained from $I(x)$ input image acquired by a camera. And $J(x)$ the fog-eliminated final image is restored by using them. Transmission rate and restored image can be obtained from [Equation 1] respectively with [Equation 3] and [Equation 4].

$$t(x)=\frac{I(x)-I_\infty}{J(x)-I_\infty}\quad\text{[Equation 3]}$$

$$J(x)=\frac{I(x)-I_\infty}{t(x)}+I_\infty\quad\text{[Equation 4]}$$

On the other hand, the fog-eliminated image $J(x)$ must satisfy $0 \le J(x) \le I(x)$. Thus, the range of $t(x)$, transmission rate is determined as [Equation 5].

$$1-\frac{I(x)}{I_\infty}\le t(x)\le 1\quad\text{[Equation 5]}$$

In [Equation 5], lower bound of transmission rate means transmission rate in case that an object is invisible because of the heavy fog or the original object has no radiance.

If the same scene under two situations of different weather conditions(with different $\beta$ values), the scenes taken through a camera can be described respectively in [Equation 6].

$$I_1(x)=J(x)t_1(x)+I_{\infty 1}(1-t_1(x))$$

$$I_2(x)=J(x)t_2(x)+I_{\infty 2}(1-t_2(x))\quad\text{[Equation 6]}$$

In addition, the interrelation between transmission rates under two situations is described in the following [Equation 7] and [Equation 8].

$$\frac{\ln t_1(x)}{\ln t_2(x)}=\frac{\beta_1}{\beta_2}=C\ (\text{Constant})\quad\text{[Equation 7]}$$

$$t_1(x)=[t_2(x)]^c\quad\text{[Equation 8]}$$

Consequently, if the scattering coefficient rate under two situations and the transmission rate under one situation are known, the transmission rate under other weather conditions can be calculated. If the atmospheric brightness value is the same (i.e. $I_{\infty 1}=I_{\infty 2}=I_\infty$) and the transmission rate under one weather condition is identical to the lower bound of [Equation 5], the transmission rate under a specific weather condition can be obtained as [Equation 9].

$$t(x)=\left[1-\frac{I(x)}{I_\infty}\right]^c,\ 0\le C<1,\quad\text{[Equation 9]}$$

wherein the scattering coefficient rate constant C is smaller than 1 because scattering coefficient in the lower bound of transmission rate situation is bigger than one under other weather conditions.

On the other hand, the restored fog-eliminated image can be obtained by substituting the transmission rate of [Equation 9] for [Equation 4] as [Equation 10].

$$J(x)=I_\infty\left(1-\left[\frac{I(x)}{I_\infty}\right]^{1-c}\right)\quad\text{[Equation 10]}$$

Figure 1:
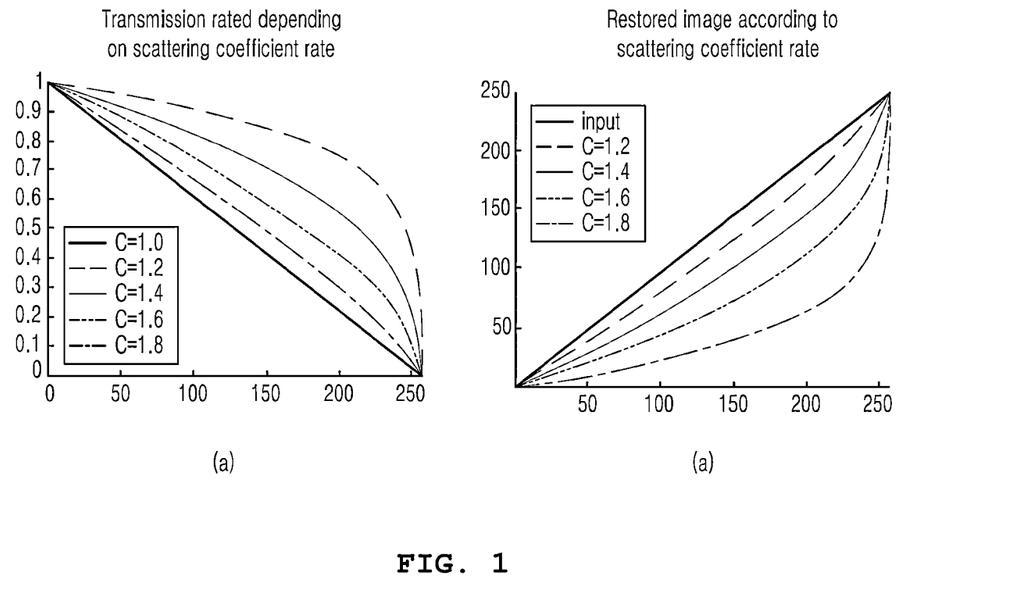
FIG. 1 illustrates an exemplary embodiment illustrating the change of transmission rate and brightness value of the restored image depending on the scattering coefficient rate according to the present invention.

FIG. 1 shows the graphs of calculation of a transmission rate (a) in [Equation 9] and a brightness value of a restored image in [Equation 10] as a scattering coefficient rate constant increases from 0.2 to 0.8 when brightness value of input pixel increase from 0 to 255.

Transmission rate approaches the lower bound of transmission rate (C=1) as C is increased. And however the fog-elimination effect for a restored image is increased, the output image will be dark. Thus, with an apparatus for improving a fogged image enabling user to control C, the fog-elimination degree and brightness can be directly controlled by a user.

Figure 2:
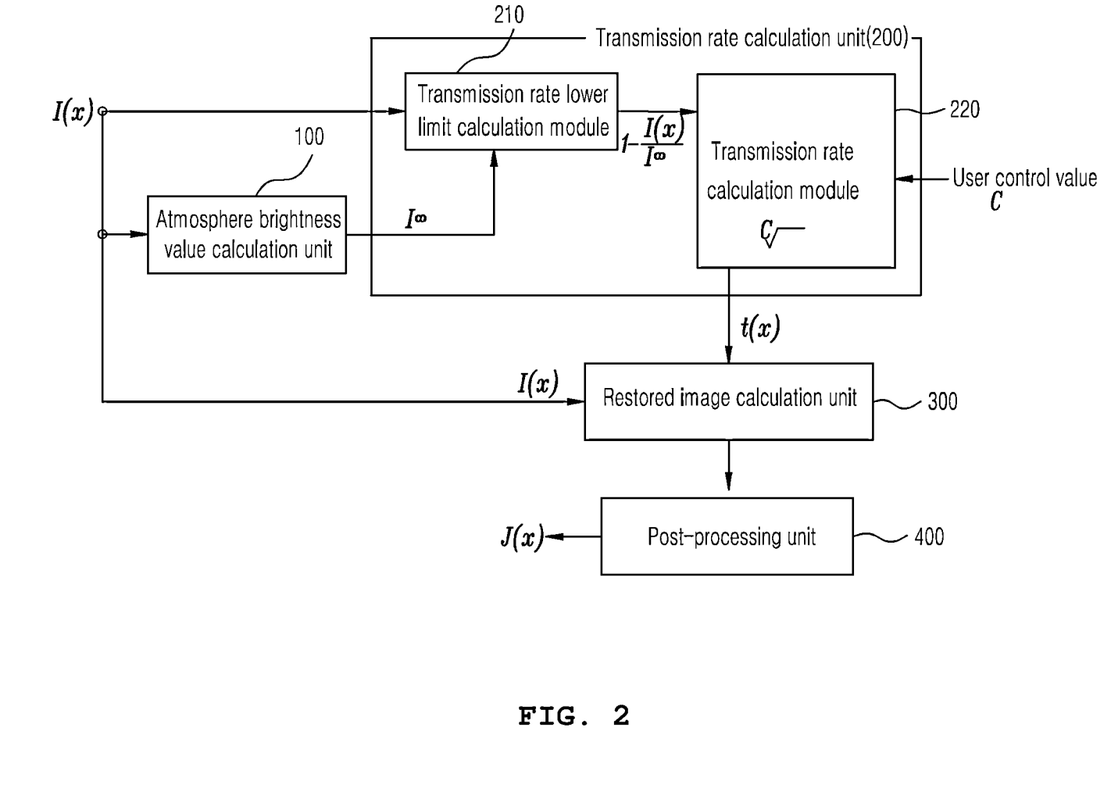
FIG. 2 illustrates an overall diagram illustrating an apparatus for improving fogged image using user-controllable root operator according to the present invention.

FIG. 2 is an overall diagram about an apparatus for improving fogged image using user-controllable root operator which comprises an atmosphere brightness value calculation unit 100, a transmission rate calculation unit 200, a restoration image calculation unit 300, a post-processing unit 400.

The atmosphere brightness value calculation unit 100 receives a fogged input image ($I(x)$), and calculates the brightest pixel value ($I_\infty$) of the air.

The transmission rate calculation unit 200 calculates the lower bound of the transmission rate representing how many rate of fog is mixed by using the pixel value ($I_\infty$) calculated by the atmosphere brightness value calculation unit 200 and a fogged image ($I(x)$), and includes 210 and 220 as illustrated in FIG. 2.

Specifically, the lower bound of transmission rate computation module 210 calculates the lower bound of transmission rate $$\left(1 - \frac{I(X)}{I_\infty}\right)$$

for a fogged input image (J(x)) by a pixel unit through [Equation 5] by using the pixel value ($I_\infty$) calculated by 200 and the fogged input image (I(x)).

$$1 - \frac{I(x)}{I_\infty} \le t(x) \le 1 \qquad \text{[Equation 5]}$$

The transmission rate calculation module 220 receives the control value (C), and calculates the transmission rate (t(x)) by root operation of the lower bound of transmission rate calculated by the lower bound of transmission rate calculation module 210 based on the input control value (C) through [Equation 9].

$$t(x) = \left[1 - \frac{I(x)}{I_\infty}\right]^c, \ 0 \le C < 1 \qquad \text{[Equation 9]}$$

The restoration image calculation unit 300 outputs the fog-eliminated image (J(x)) by [Equation 10] and [Equation 4] using the atmosphere brightness value ($I_\infty$) and transmission rate ((t(x)) calculated by the transmission rate calculation unit 200 and a fogged input image (I(x)).

$$J(x) = \frac{I(x) - I_\infty}{t(x)} + I_\infty \qquad \text{[Equation 4]}$$

$$J(x) = I_\infty\left(1 - \left[1 - \frac{I(x)}{I_\infty}\right]^{1-c}\right) \qquad \text{[Equation 10]}$$

The post-processing unit 400 performs brightness stretching and color processing (chrominance signal process) for the image outputted from the restoration image calculation unit 300, and outputs the fog-eliminated final image.

Figure 3:
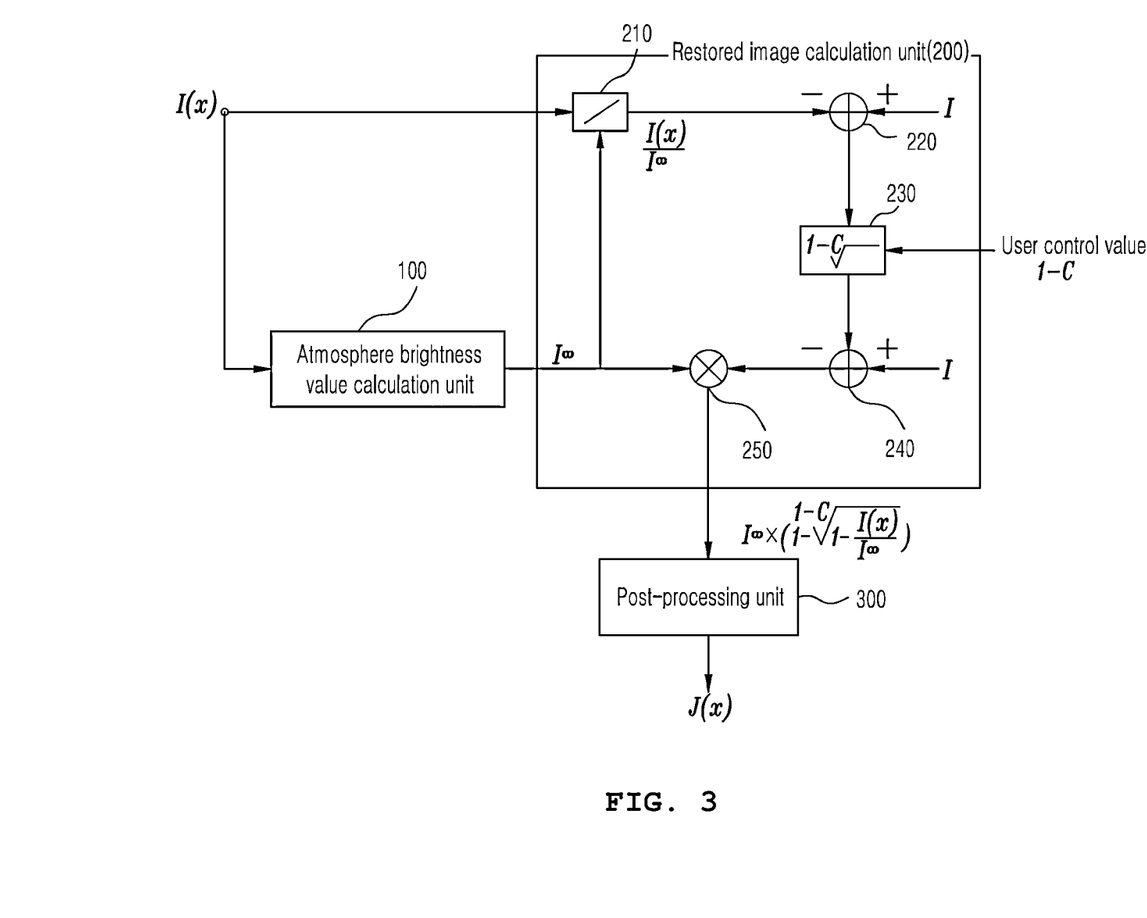
FIG. 3 illustrates a diagram illustrating an apparatus for improving fogged image using user-controllable root operator according to the first exemplary embodiment.

Meanwhile, FIG. 3 is a diagram about an apparatus for improving fogged image using user-controllable root operator according to the first exemplary embodiment of the present invention, and the apparatus comprises the atmosphere brightness value calculation unit 100, the restoration image calculation unit 200, the post-processing unit 300 as illustrated.

The atmosphere brightness value calculation unit 100 receives a fogged image (I(x)), and outputs the brightest pixel value ($I_\infty$) of the atmosphere.

The restoration image calculation unit 200 receives the fogged input image (I(x)) and the brightest pixel value ($I_\infty$) of the atmosphere calculated by the atmosphere brightness value calculation unit 100, and outputs $$\left[1 - \frac{I(x)}{I_\infty}\right]^{1-C}$$

value through a division operator 210, a subtraction operator 220, and a root operator 230 performing the (1−C)th root operation based on control value, and output the fog-eliminated image by subtracting the output value of the root operator 230 from 1 using the subtraction operator 220 and multiplying the pixel value from the atmosphere brightness value calculation unit 100 by the output from the subtraction operator 220 using the multiplication operator 250.

The pre-process unit 300 performs brightness stretching and color processing (chrominance signal process) for the image outputted from the restoration image calculation unit 200.

Figure 4:
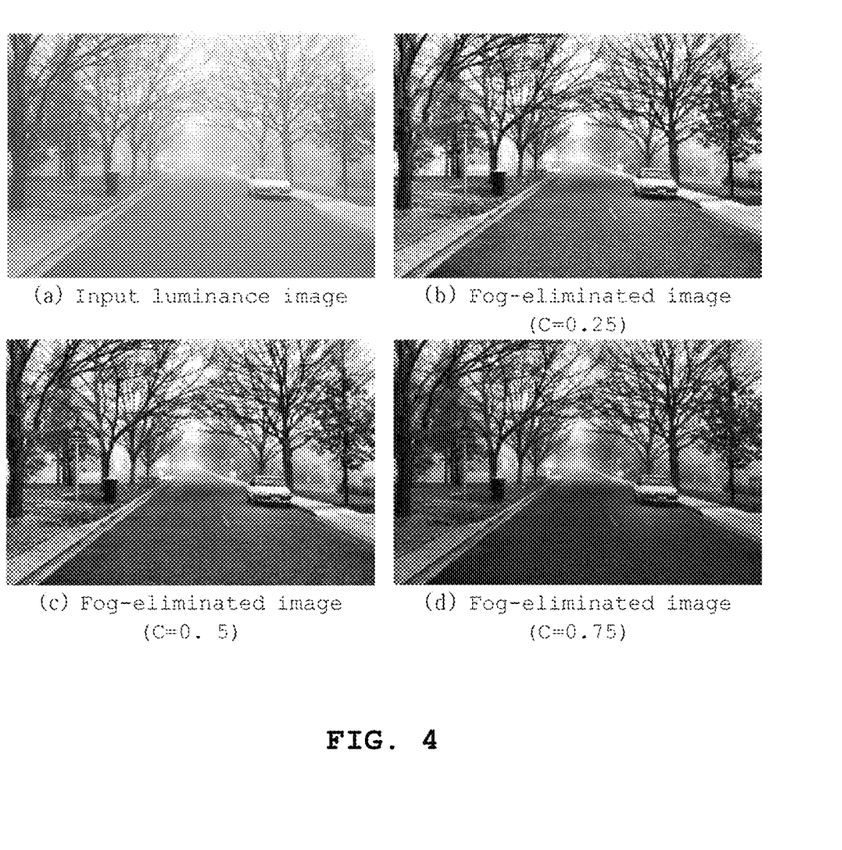
FIG. 4 and FIG. 5 illustrate examples showing the simulation result (fog-eliminated images according to user control value).
Figure 5:
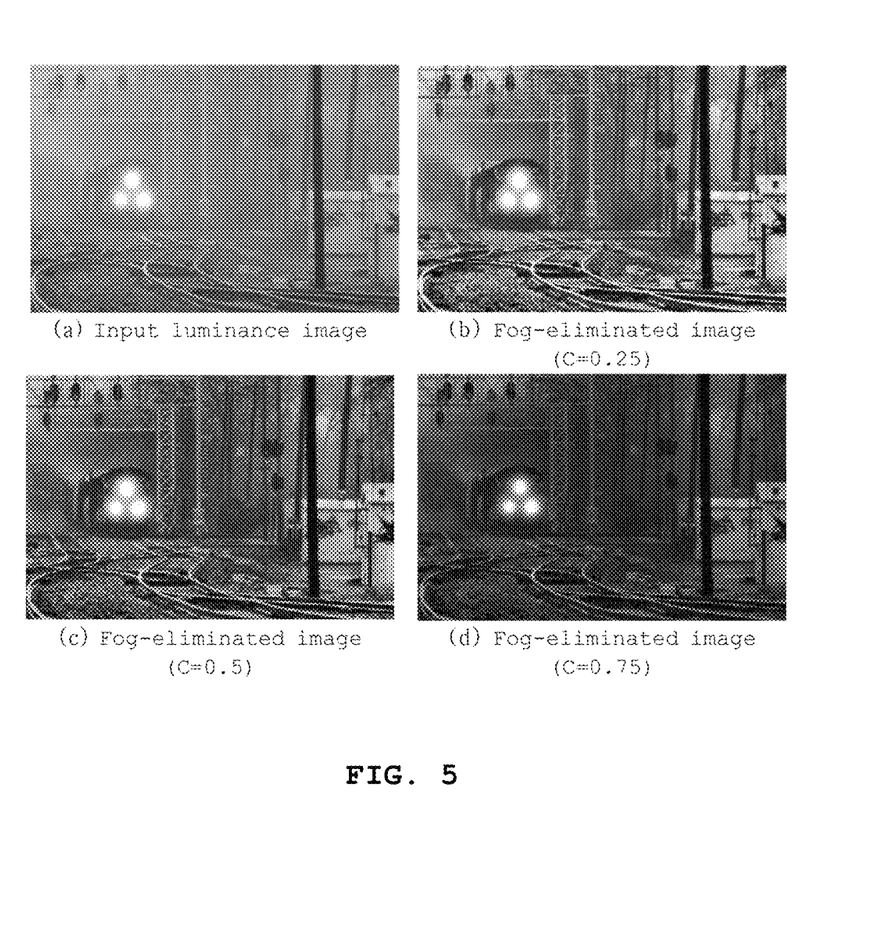

FIGS. 4 and 5 show the result of simulation by an apparatus for improving fogged image. (a) is a fogged input image. (b) is the result image of fog-elimination process under user control value C=0.25, (c) is the result image of fog-elimination process under user control value C=0.5, and (d) is the result image of fog-elimination process under user control value C=0.75.

Although the present invention has been described in conjunction with the preferred embodiments which illustrate the technical spirit of the present invention, it will be apparent to those skilled in the art that the present invention is not limited only to the illustrated and described configurations and operations themselves but a lot of variations and modifications are possible without departing from the scope of the spirit of the invention. Accordingly, all of appropriate variations, modifications and equivalents are considered to pertain to the scope of the present invention.

What is claimed is:

1. An apparatus for improving fogged image by using user-controllable root operator, comprising:
    an atmosphere brightness value calculation processor calculating an atmospheric brightness value ($I_\infty$), wherein the atmospheric brightness value ($I_\infty$) is a value of a brightest pixel in a fogged input image (I(x)) acquired by a camera;
    a transmission rate calculation processor including
        a lower bound calculation module calculating a lower bound of a transmission rate for each pixel of the fogged input image by using the atmospheric brightness value ($I_\infty$) calculated by the atmosphere brightness value calculation processor and the fogged input image (I(x)) for said each pixel, wherein the lower bound of the transmission rate is calculated by a first equation of $$1 - \frac{I(x)}{I_\infty},$$

wherein x is an $x_{th}$-pixel, and
a transmission rate calculation module calculating the transmission rate t(x) for said each pixel of the fogged input image (I(x)) by using the lower bound of the transmission rate and a control value (C), wherein the transmission rate (t(x)) is calculated by a second equation of $$t(x) = \left[1 - \frac{I(x)}{I_\infty}\right]^c, \ 0 \le C < 1,$$

and
wherein C is a constant value selected by a user;
a restoration image calculation processor outputting a fog-eliminated image (J(x)) for said each pixel by using the transmission rate (t(x)) for said each pixel calculated by the transmission rate calculation processor, the control value (C) and the atmospheric brightness value ($I_{28}$); and a post-processing processor outputting a fog-eliminated final image by performing brightness stretching or color processing to the fog-eliminated image (J(x)).

2. The apparatus according to claim 1, wherein the restoration image calculation processor calculating the fog-eliminated image (J(x)) by using a third equation of $$J(x) = I_\infty \left( 1 - \left[ 1 - \frac{I(x)}{I_\infty} \right]^{1-c} \right).$$

* * * * *